United States Patent
Eichenbaum et al.

[15] 3,635,839
[45] Jan. 18, 1972

[54] MODIFIED CATALYST SYSTEM FOR STEREOSPECIFIC POLYMERIZATION OF OLEFINS

[72] Inventors: Raymond Eichenbaum, Providence, R.I.; James G. Murray, East Brunswick, N.J.

[73] Assignee: Mobil Oil Corporation

[22] Filed: Sept. 11, 1968

[21] Appl. No.: 759,238

[52] U.S. Cl. .................................................................252/429
[51] Int. Cl. .........................................................B01f 13/00
[58] Field of Search ...............................................252/429 B

[56] References Cited

UNITED STATES PATENTS

| | | | |
|---|---|---|---|
| 3,242,156 | 3/1966 | Marconi | 260/94.3 |
| 3,429,862 | 2/1969 | Foder | 260/93.7 |
| 3,414,544 | 12/1968 | Kahlr | 260/93.7 |
| 3,445,446 | 5/1969 | Farrer | 260/94.3 |
| 3,205,213 | 9/1967 | Stearns | 260/94.3 |

Primary Examiner—Daniel E. Wyman
Assistant Examiner—Philip M. French
Attorney—Oswald G. Hayes, Andrew L. Gaboriault and Hastings S. Trigg

[57] ABSTRACT

Homopolymers and copolymers of 1-olefins ($C_3$–$C_{10}$) having a high degree of tacticity are produced in the presence of a novel catalyst system composed of (A) a compound of a transitional metal of Groups IVA, VA, VIA, and VIII of the Periodic Arrangement of the Elements wherein the metal is present in a valence state lower than its maximum and (B) the reaction product of a dialkyl-aluminum chloride and iodine.

2 Claims, No Drawings

MODIFIED CATALYST SYSTEM FOR STEREOSPECIFIC POLYMERIZATION OF OLEFINS

BACKGROUND OF THE INVENTION

Field of the Invention

This invention relates to stereospecific polymerization of 1-olefins. It is more particularly concerned with a novel catalyst system for such polymerization.

Description of the Prior Art

As is well known to those familiar with the art, various so-called Ziegler-Natta catalyst combinations have become well known in the art for polymerizing and copolymerizing 1-olefins to tactic polymers. In many cases, however, such as when using a combination of titanium trichloride catalyst and dialkylaluminum chloride cocatalyst, the degree of tacticity of the polymer has been relatively low, as measured by Isotactic Index (I.I.) of about 90 or lower. Insofar as is now known, the particular catalyst system described herein has not been proposed for producing polymers having an I.I. greater than 90.

SUMMARY OF THE INVENTION

This invention provides a catalyst system for polymerizing and copolymerizing 1-olefins to polymers of high tacticity that comprises (A) a compound of a transitional metal compound of Groups IVA, VA, VIA, and VIII of the Periodic Arrangement of the Elements wherein the metal is present in a valence state lower than its maximum and (B) the reaction product of a dialkylaluminum chloride and iodine.

DESCRIPTION OF SPECIFIC EMBODIMENTS

The catalyst system of this invention is composed of at least two components, one being a compound of a transitional metal of Groups IVA, VA, VIA, and VIII of the Periodic Arrangement of the Elements in which the metal is in a reduced valence state, and the other being the reaction product of a dialkylaluminum chloride and iodine. The Periodic Arrangement of the Elements, as referred to herein, is that published in the Journal of Chemical Education, Volume 16, page 409 (1939).

Among the reducible transitional metal compounds suitable for the purposes of this invention are the heavy-metal, inorganic compounds such as halides, oxyhalides, hydroxides, and organic compounds such as alcoholates, acetates, benzoates, and acetylacetonates, of the metals of Groups IVA, VA, VIA, and VIII of the Periodic Arrangement of the Elements. Such metals include titanium, zirconium, hafnium, thorium, uranium, vanadium, niobium, tantulum, chromium, molybdenum, tungsten, and iron. The metal halides, particularly the chlorides, are generally preferred. Titanium, zirconium, and vanadium are the most active metals. The following heavy-metal compounds are readily reducible to catalyst components in this invention: titanium tetrachloride, titanium tetrabromide, zirconium tetrachloride, vanadium tetrachloride, and zirconium acetylacetonate.

These transitional metal compounds can be reduced to valence states lower than maximum valence by a number of ways well known in the art. As exemplified by titanium tetrachloride, it can be reduced to titanium trichloride by hydrogen to a brown amorphous substance, which is converted into the violet crystalline form by heating at an elevated temperature in the order of 200° C. The reduction can be accomplished by heating titanium tetrachloride with metallic titanium or aluminum under pressure. This reduction can also be promoted by Friedel-Crafts halides. In the case of the aluminum reduction, the product will comprise titanium trichloride and aluminum trichloride. The reduction can also be effected by an organometallic compound of Group II or III to produce a crystalline titanium halide in a valence state lower than maximum. In practicing the present invention, the particular method of obtaining the transitional metal compound of reduced valence state is not pertinent. Indeed, many reduced compounds contemplated herein are commercially available.

The other component (cocatalyst) of the catalyst system of this invention is the reaction product of a dialkylaluminum chloride and iodine. The alkyl groups in the dialkylaluminum can contain two to 10 carbon atoms but preferably are lower alkyl ($C_2$–$C_4$). Utilizable compounds include diethylaluminum chloride, dipropylaluminum chloride, diisopropylaluminum chloride, diisobutylaluminum chloride, diamylaluminum chloride, dihexylaluminum chloride, dioctylaluminum chloride, di(2-ethylhexyl) aluminum chloride, and didecylaluminum chloride.

It is essential that the dialkylaluminum chloride be reacted with the iodine prior to admixture with the transitional metal catalyst. Reaction in situ in the polymerization reactor does not produce a catalyst system having the effectiveness contemplated herein. The reaction between dialkylaluminum chloride and iodine is carried out at temperatures between about 40° C. and about 120° C. Preferably, a suitable hydrocarbon solvent is used, such as n-heptane, octane, benzene, toluene, or xylene. When a solvent or dispersing medium is used in the polymerization reaction, it is preferred to use the same solvent or dispersant in the iodine reaction. The molar ratio of dialkylaluminum chloride to iodine can be between about 0.01 and 20, preferably between 2 and 6. The reaction is substantially complete in a few minutes, but it is preferable to heat the reaction mixture at higher temperatures for an hour or so to ensure complete reaction.

In activating the reduced transitional metal compound with the aforedescribed reaction product for polymerization purposes, various ratios can be used. Thus, the molar ratio of dialkylaluminum chloride-iodine reaction product to transitional metal compound (e.g., Al/Ti) can range from 0.5 to 6. A ratio of 2–4 is preferred.

The catalyst system of reduced transitional metal compound and dialkylaluminum chloride-iodine reaction product can be formed in several ways known in the art. The catalyst system can be formed by separately charging the catalyst components to the polymerization reaction zone in the proper ratio so that they are combined in the reaction zone or just prior to their entry therein. In the case of continuous operation the components will be separately metered to the reaction zone in the proper ratio.

The 1-olefin monomers are those having between three and 10 carbon atoms. Thus, there are contemplated propylene and the butene-1 and higher olefins, as fully set forth in U.S. Pat. No. 3,362,940, to which reference is made. The catalyst system of this invention can also be used to form copolymers of these 1-olefins with each other.

The polymerization of propylene is usually carried out in a slurry in liquid propylene or in an inert diluent, such as heptane, octane, benzene, and other diluents well known in the art. In the case of butene-1 and higher olefins, however, it is preferred to use the solution polymerization techniques described in U.S. Pat. No. 3,362,940, to which reference is made. As is readily understood by those skilled in the art, all operations of catalyst preparation and polymerization are carried out under an inert atmosphere such as dry nitrogen, flue gas, etc.

In the examples and tables, the degree of tacticity of polymer product is measured as Isotactic Index (I.I.). In the case of propylene or predominantly propylene polymers, it is the weight percent of polymer insoluble in boiling n-heptane. In the case of butene and higher polymers, it is the weight percent of polymer insoluble in diethyl ether. The Melt Index (M.I.) is determined in accordance with ASTM Designation: D1238–65T, using Condition "L" for polypropylene and Condition "E" for polybutene. The Tensile Modulus (T.M.) and Yield Strength (Y.S.) are determined in accordance with ASTM Designation D638–67T. Catalyst Activity is the weight polymer per weight $TiCl_3$ per hour.

The following examples illustrate the preparation of the modified cocatalyst and demonstrate the advantages of the catalyst system of this invention.

EXAMPLE 1

A solution of diethylaluminum chloride in n-heptane (40 millimoles in 25 percent solution 25.6 cc.) was placed in a reaction vessel and kept under a nitrogen atmosphere. Crystalline iodine (9.1 millimoles) was then slowly added and the mixture was heated to about 61° C. At this temperature, the distinctive violet color of the iodine in the solution disappeared, signifying reaction. The clear reaction mixture was heated to about 98° C. and refluxed for an hour. This reaction product of diethylaluminum chloride and iodine (modified cocatalyst) was used in subsequent polymerization runs.

EXAMPLES 2-5

A series of polymerization runs were carried out, two using diethylaluminum chloride (DEAC) as the cocatalyst and two using the modified cocatalyst of example 1. In each run, 2,000 cc. of butene-1 was placed in a 1 gal. autoclave under a nitrogen atmosphere, with 25 millimoles of $H_2$ for molecular weight control. The autoclave was heated to 150° F. Then, the cocatalyst component was flushed into the autoclave with 200 cc. butene-1, followed by $TiCl_3$, using an Al/Ti molar ratio of 3. Stirring was maintained at 1,000 r.p.m. After a 1- or 3-hour polymerization period, the reaction was quenched with methanol containing antioxidant and polymer product was filtered off, washed, and dried overnight at 80° C. Pertinent data and results are set forth in the following table.

TABLE

| Example | Cocatalyst | Time, hours | Catalyst activity | I.I. | T.M.×10⁻¹, p.s.i. | Y.S., p.s.i. | M.I. |
| --- | --- | --- | --- | --- | --- | --- | --- |
| 2 | DEAC | 1 | 410 | 84.6 | 12.4 | 760 | 0.28 |
| 3 | Modified | 1 | 344 | 97.2 | 34.5 | 2,600 | 0.38 |
| 4 | DEAC | 3 | 320 | 82.4 | 13.0 | 1,189 | 0.12 |
| 5 | Modified | 3 | 165 | 96.6 | 52.5 | 2,820 | 0.42 |

EXAMPLE 6

In a 1-liter autoclave were placed 1,900 ml. of propylene to which was added 4.87 ml. of a modified cocatalyst prepared as described in example 1 (molar ratio of $Al:I_2=3.0$) in 100 ml. of propylene and hydrogen to control molecular weight. $TiCl_3$ (0.5 g.) was then washed in the autoclave with 200 ml. propylene and the mixture was stirred and heated for 3 hours at 150° F. (66° C.). At the end of this time, the product was treated with 600 ml. of methanol and the excess propylene distilled. The product, filtered and dried in vacuum, amounted to 210.7 g. which was 98.7 percent insoluble in boiling heptane, i.e., I.I. was 98.7.

EXAMPLE 7

The autoclave was charged with 1,200 ml. of heptane and propylene to keep the pressure at 250 p.s.i. throughout the run (1,510 ml. total propylene). The catalyst was 1.0 g. $TiCl_3$ with 9.74 ml. of the $DEAC:I_2$ solution described in example 6. After a 1-hour reaction at 150° F., the product was treated with 500 ml. methanol and cooled. The solid was filtered and dried and weighed 141 g. The heptane filtrate contained 0.72 g. (0.5 percent) of atactic polymer. No atactic polymer was extracted from the solid polymer by boiling heptane.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A catalyst system for polymerizing and copolymerizing 1-olefins to polymers of high tacticity that consists essentially of component A, titanium trichloride and component B, the reaction product of a dialkylaluminum chloride having two to 10 carbon atoms per alkyl group and iodine, reacted in a molar ratio of dialkylaluminum chloride to iodine of 0.01 to 20 at a temperature of between about 40° C. and about 120° C., the molar ratio of component B to component A being about 0.5 to 6.

2. A catalyst system of claim 1, wherein component B is diethylaluminum chloride.

* * * * *